United States Patent Office 3,299,714
Patented Jan. 24, 1967

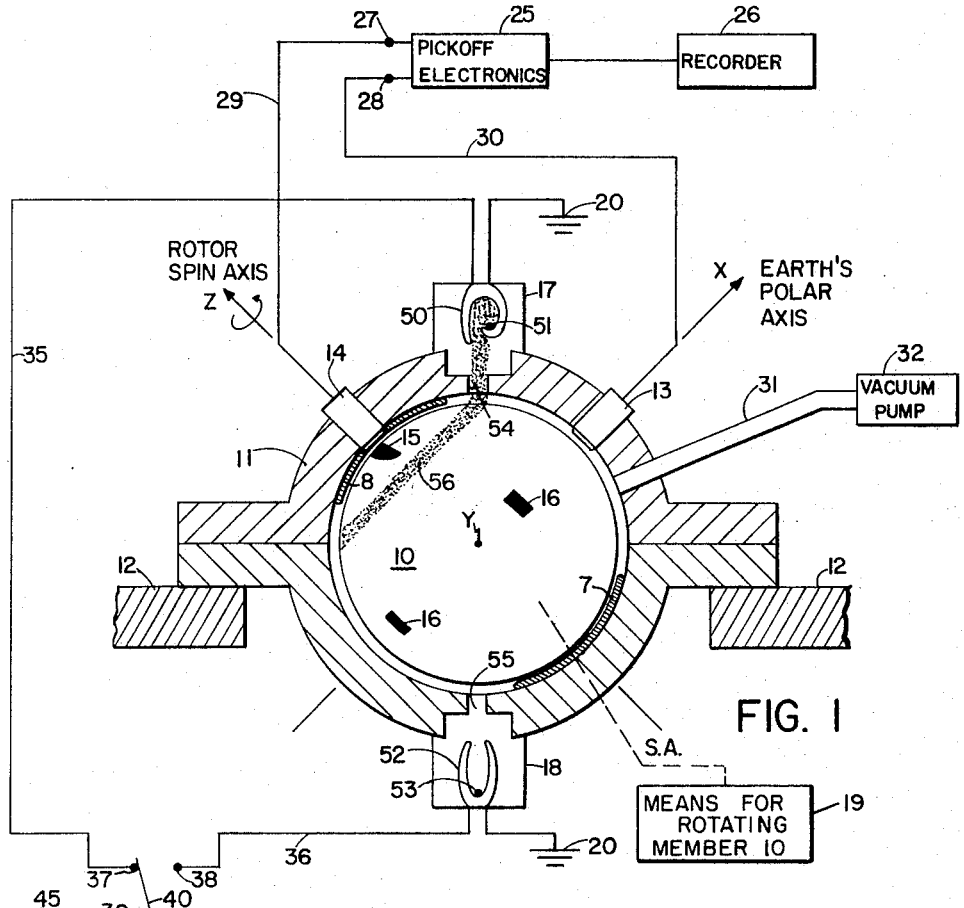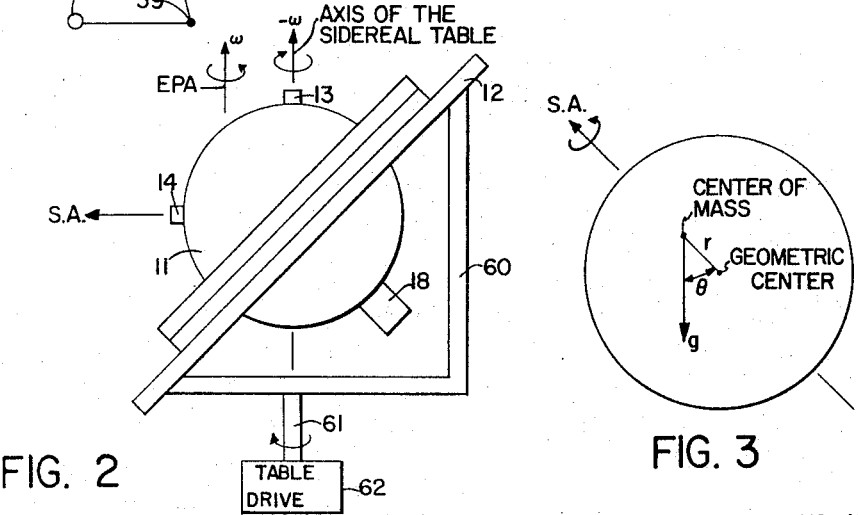

3,299,714
BALANCING APPARATUS
Howard J. Thompson, Stillwater, and Harold D. West, St. Louis Park, Minn., assignors to Honeywell Inc., a corporation of Delaware
Filed Jan. 15, 1964, Ser. No. 337,861
5 Claims. (Cl. 73—468)

The present invention pertains to the balancing of rotating members. More particularly it pertains to the balancing of inertial members in inertial instruments, where extremely fine balance of an inertial member is required.

The present invention resulted from an attempt to develop a method to trim axial mass unbalance of the gyro rotor to a much finer level than previously possible. The final balancing had heretofore been done by preferential lapping during the finishing stages of the rotor fabrication. It was considered necessary to improve on the results obtained by that method. This was found to be accomplished with remarkable success by using the present invention which provides that the final axial mass unbalance be corrected by vacuum vapor deposition of some appropriate metal onto the desired latitude of the rotor as it is suspended and spinning. Although the present invention has broad applications it is especially well adapted to balancing rotors of an electrostatically supported gyroscope, because both the electrostatic suspension and the vacuum vapor deposition require high quality vacuum for satisfactory operation.

In its preferred embodiment the present invention includes a balance fixture capable of measuring rotor axial mass unbalance and correcting such unbalance by depositing metallic vapor in a uniform band on the rotor at a particular latitude on the hemisphere exhibiting a deficiency of mass (a relatively smaller mass). When referring to the two hemispheres of the inertial member it is assumed that the imaginary plane dividing the member into two halves is perpendicular to the spin axis of the inertial member. The rotor is compared to earth and similar notations of latitude, longitude, equator, spin axis, and upper and lower hemispheres are employed.

In the preferred embodiment of the invention, the balancing fixture is mounted on a rate table which is rotatable about an axis parallel to the spin axis of the earth (earth's polar axis, hereafter referred to as EPA). The table is rotated at a rate identical to the earth's rate, but in the opposite direction, to offset the earth's rate. Other means or methods of compensation could, of course, be used to obtain the same end results, but a rate table proved to be simple, accurate and practical.

It is therefore an object of this invention to provide a means for balancing the mass of a member with a high degree of accuracy.

A more specific object of the present invention is to provide an apparatus for correcting the mass unbalance of an inertial member of a gyroscope.

Another object of the invention is to provide a means for correcting extremely small errors in the surface contour of a member.

A better understanding of these and further objects will come from examination of the following specification, claims, and drawings in which:

FIGURE 1 shows a cross section of a vacuum vapor deposition apparatus;

FIGURE 2 shows the apparatus of FIGURE 1 mounted on a rate table;

FIGURE 3 illustrates graphically the drift of the rotor's spin axis due to various torques.

Figure 4:
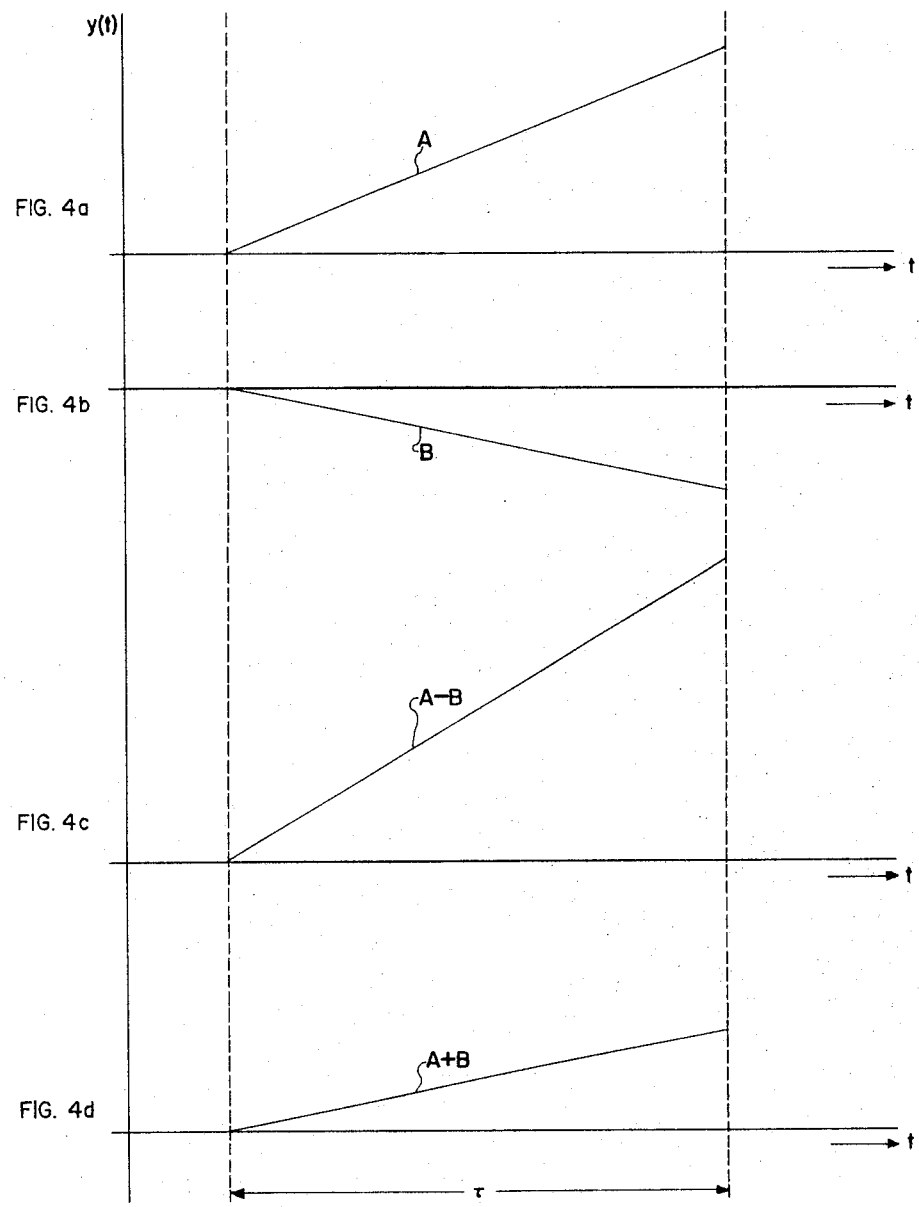
FIGURE 4 illustrates schematically the relation of the center of mass to the geometric center of a spherical member exhibiting mass unbalance.

Referring now to FIGURE 1 an inertial member 10 is supported by support members 7 and 8 within a housing 11 for rotation about a spin axis Z. The support of inertial member 10 within the housing can be achieved in many ways. Electrostatic suspension is preferable because it eliminates mechanical friction and most perfectly isolates the inertial member from the supporting structure. An example of electrostatic suspension can be found in U.S. Patent 3,003,356, dated October 10, 1961. Housing 11 is mounted on a table 12. A pair of optical pickoffs 13 and 14 are mounted on housing 11. The pickoffs protrude through the housing 11 and are adapted to sense the relative motion between inertial member 10 and housing 11. Inertial member 10 has inscribed thereon a non-reflective pattern comprised of a D spot 15 centered on the spin axis at one end of inertial member 10, and phase marks 16 lying in the equatorial region of inertial member 10. Pickoff 14 is adapted to view the polar region of inertial member 10 and pickoff 13 is adapted to view the equatorial region of inertial member 10. The output of pickoff 13 is connected to an input 28 of the pickoff electronics 25 by means of a conductive lead 30. Pickoff electronics 25 further has an input terminal 27 and an output. Input terminal 27 is connected to the output of pickoff 14 by means of a conductive lead 29 and the output of pickoff electronics 25 is connected to the input of a recorder 26.

Housing 11 also has a pair of ports or apertures 54 and 55, aperture 54 being adjacent to inertial member 10 near the 45° latitude of the upper hemisphere and aperture 55 being near the 45° latitude of the lower hemisphere. A vacuum vapor deposition element 17 is mounted on housing 11 adjacent to aperture 54, and a vacuum deposition element 18 is mounted adjacent to aperture 55 on housing 11. Vapor deposition element 17 includes a heating filament 50 having one end connected to ground 20 and its other end connected to a terminal 37 by means of a conductive lead 35. A portion of filament 50 is formed into a cup like shape which contains a small quantity of gold 51. When filament 50 is energized it heats up to a high temperature and vaporizes gold 51. Gold vapor enters the housing 11 through aperture 54 and is deposited on inertial member 10 in the form of a band 54. Gold is mentioned here for illustration purposes only. It is understood that other appropriate material could be used. The advantages of using gold are that it will vaporize at a relatively low temperature and that it has high density, therefore allowing for maximum mass compensation with the minimum disturbance of the rotor surface. Also gold is non-magnetic and will not interfere with the operation of an electrostatic gyroscope.

Vapor deposition element 18 is comprised of a heating filament 52 formed in a cup like shape and having one of its ends connected to ground 20 and the other end to a terminal 38 by means of a conductive lead 36. A small quantity of gold 53 is placed in the cup formed by filament 52. Filaments 50 and 52 can be energized from a positive potential source 45 by means of a switch 40 which is able to connect either terminal 37 or 38 to a source of electric potential 45.

A vacuum pump 32 is attached to housing 11 by means of a conduit 31 to maintain the interior of housing 11 at a high vacuum level.

To determine the drift due to the axial mass unbalance of inertial member 10 it is necessary to separate the apparent drift of inertial member 10 due to the rotation of the earth. One way this may be accomplished is by mounting housing 11 on a rate table 12 which rotates at an angular rate exactly equal to the rate of the earth, but in an opposite sense. In FIGURE 2 housing 11 is shown mounted on a rate table 12. Table 12 is connected to a shaft 61 by means of a connecting bracket 60. Shaft 61 and table 12 with the apparatus carried thereon is rotated about an axis by table drive 62. The axis about which the table is rotated is parallel to the earth's polar axis. Housing 11 and inertial member 10 are oriented in such a way that the spin axis of inertial member 10 is perpendicular to the axis of the table and the earth's polar axis and is therefore parallel to the equatorial plane of the earth.

This has been found to be a practical and accurate means for compensating the angular rate of the earth. It should be understood, however, that other means, such as computer means, could be used to accomplish the same result, and that the preferred embodiment shown in FIGURE 2 is for illustration purposes only.

Axial mass unbalance is the product of the mass of the member $m$, the distance separating the axial component of the center of mass from the geometric center of the member $r$, and the force of gravity $g$. Referring to FIGURE 3:

$$\text{mass unbalance} = \mu$$
$$\mu = mrg$$

If the force of gravity is acting at an angle to the spin axis of the member, the axial mass unbalance will produce a torque on the inertial member about a first axis perpendicular to the spin axis which in turn will cause the member to precess about a second axis perpendicular to both the spin axis and the first axis. This precession is undesirable because it interferes with the operation of the gyro and causes the spin axis of the member to drift from its fixed direction in space.

$$\text{drift} = D = \frac{T}{H} = \frac{T}{\mu I}$$

Where T is the total torque produced by the axial mass unbalance and other torques and H is rotor momentum or $\mu I$, $\mu$ being the angular velocity of the inertial member and I its moment of inertial about the spin axis.

In electrostatically supported gyroscopes, where the mechanical torques interacting between the inertial member and the supporting envelope, have been practically eliminated, the axial mass unbalance $amu$ contributes a very significant fraction of the torque causing the drift.

$$T_{\text{axial mass unbalance}} = \mu \cos \theta = mrg \cos \theta$$

Where $\theta$ equals the angle between the spin axis and the gravity vector.

$$T = T_{\text{axial mass unbalance}} + T_{\text{other}}$$
$$= \mu \cos \theta + T_{\text{other}}$$

If it were possible to determine the portion of the drift caused by the axial mass unbalance $amu$ alone, then $$D(a\mu) = \frac{T}{H} = \frac{\mu \cos \theta}{H}$$

and $$\mu = \frac{DH}{\cos \theta}$$

from which the axial mass unbalance would be easily determined since the rotor momentum H and the angle between the spin axis and the force of gravity can be easily determined. This indeed is possible and a specific way of accomplishing the result is explained later on.

In FIGURE 1 inertial member 10 is spinning about a spin axis Z. The relative rotational displacement between the spin axis of inertial member 10 and housing 11 is detected and measured by pickoffs 13 and 14 in cooperation with the pattern on inertial member 10. The theory of operation of the pickoff arrangement will not be discussed in detail here since it is already the subject of patent application Serial No. 276,737, filed on April 30, 1963, now Patent No. 3,239,673. The above referenced patent application may be referred to if additional information about the pickoff arrangement is desired. Since the rotation of the earth is compensated for by equal and opposite rotation of table 12 on which housing 11 is mounted, housing 11 maintains a substantially constant angular attitude in the inertial space. The angular displacement between the spin axis of the inertial member 10 and housing 11 will therefore not be due to the rotation but rather to the motion of the spin axis. This motion is called the drift of the spin axis and is detected by pickoffs 13 and 14, processed by the pickoff electronics 25 and recorded by recorder 26. A typical recording of recorder 26 is illustrated in FIGURES 4A and 4B showing the angular rotation of the spin axis with passage of time. This total drift, as explained before, is caused by torques due to axial mass unbalance and other torques.

The procedure for determining or isolating the mass unbalance torque from the total torque is explained below. The inertial member 10 is caused to spin by means 19 about spin axis Z parallel to the equatorial plane of the earth and the drift of the spin axis is recorded over a sufficient length of time. Means 19 for spinning up the inertial member can be such as in Patent 3,003,356, issuing October 10, 1961. The inertial member 10 is then rotated 180° about an axis perpendicular to the spin axis and the drift again recorded. The effect of the axial mass unbalance torque in the second case would be just opposite of that in the first case. It has been theoretically predicted and later experimentally verified that with the inversion of the inertial member the only significant torque which changes polarity is that due to the axial mass unbalance while the other torques retain the same polarity and substantially the same magnitude. As an illustration the drift recording of the first instance may be shown in FIGURE 4A and the drift of the inverted inertial member in FIGURE 4B. In both FIGURES 4A and 4B the torques other than those due to axial mass unbalance are responsible for a positive drift while the drift due to axial mass unbalance is positive in FIGURE 4A and negative in FIGURE 4B. Subtracting curve B from curve A, as illustrated in FIGURE 4C, a result equal twice the drift due to axial mass unbalance is arrived at since the torques due to all other significant sources are cancelled out. By adding curves A and B, as illustrated in FIGURE 4D, the drift due to axial mass unbalance is cancelled out and the resulting curve illustrates twice the magnitude of the drift due to other torques. As can be seen, this offers a simple method for determining the axial mass unbalance which can be corrected by adding the appropriate amount of mass to the hemisphere exhibiting a deficiency of mass. This can be accomplished in the apparatus of FIGURE 1 by energizing the appropriate vapor deposition element and depositing a band of metallic vapor on inertial member 10 through ports 54 or 55. Only one vapor deposition element is absolutely required because inertial member 10 could be rotated to the appropriate position adjacent the vacuum vapor deposition element.

The emphasis of the specification has been on the application of the present invention to the correction of axial mass unbalance. Other applications, however, are quickly evident. The invention could be equally well employed to correct the radial mass unbalance or to change the surface contour of a member, as for example to correct the non-sphericity of a spherical member. The employment of vapor deposition in shaping the surface or correcting the errors in the surface contour has been shown feasible in the laboratory. The arrangement comprises a capacitive bridge type of sensing means for measuring the shape of the inertial member and for detecting any deviation of the surface from the desired shape. The vapor deposition element is so mounted that it can be moved relative to the inertial member adjacent to any location on the member where the sensing means detects a deficiency of mass.

Many variations and embodiments are possible within the spirit of this invention. It is, therefore, understood that the specific embodiment of our invention shown here is for the purpose of illustration only, and that our invention is limited only by the scope of the appended claims.

What is claimed is:

1. An apparatus for fine-balancing the inertial member for a gyroscope, said apparatus comprising:
   a housing enclosing a hermetically sealed chamber;
   a vacuum pump attached to said housing and adapted to keep said chamber at a high vacuum level;
   support means within said housing;
   a substantially spherically shaped member, having an upper and a lower hemisphere positioned on said support means within said housing for rotation about a spin axis passing through the central point of each of said hemispheres;
   means for rotating said member about said spin axis;
   means for measuring the axial mass unbalance of said member;
   a source of electric potential;
   a first vapor deposition element mounted adjacent said housing and being capable when energized of depositing metallic vapor on said upper hemisphere of said member;
   a second vapor deposition element mounted adjacent said housing and being capable when energized of depositing meallic vapor on said lower hemisphere of said member; and
   means connecting said first and said second vapor deposition elements to receive signals from said electric potential source when said measuring means indicates mass unbalance, energizing said first element when said measuring means indicates a deficiency of mass in said upper hemisphere and energizing said second element when said measuring means indicates a deficiency of mass in said lower hemisphere.

2. An apparatus for fine-balancing the inertial member for a gyroscope, said apparatus comprising:
   a housing enclosing a hermetically sealed chamber;
   a vacuum pump attached to said housing and adapted to keep said chamber at a high vacuum level;
   support means within said housing;
   a substantially spherically shaped member, having an upper and a lower hemisphere, positioned on said support means for rotation about a spin axis passing through the central point of each of said hemispheres, said axis being inclined to the vertical;
   means for rotating said member about said spin axis;
   means for measuring the axial mass unbalance of said member;
   a source of electric potential;
   a first vapor deposition element mounted adjacent said housing and being capable when energized of depositing metallic vapor on said upper half of said member;
   a second vapor deposition element mounted adjacent said housing and being capable when energized of depositing metallic vapor on said lower half of said member; and
   means connecting said first and said second vapor deposition elements to receive signals from said electric potential source when said measuring means indicates mass unbalance, energizing said first element when said measuring means indicates a deficiency of mass in said upper half and energizing said second element when said measuring means indicates a deficiency of mass in said lower half.

3. An apparatus for fine-balancing the inertial member for a gyroscope, said apparatus comprising:
   a support;
   a substantially spherically shaped member, having an upper and a lower hemisphere positioned on said support for rotation about a spin axis passing through the central point of each of said hemispheres;
   means for measuring the means for rotating said member about said spin axis; mass unbalnace of said member;
   a source of electric potential;
   a first vapor deposition element mounted on said support and being capable when energized of depositing metallic vapor on said upper hemisphere of said member;
   a second vapor deposition element mounted on said support and being capable when energized of depositing metallic vapor on said lower hemisphere of said member; and
   means connecting said first and said second vapor deposition elements to receive signals from said electric potential source when said measuring means indicates mass unbalance, energizing said first element when said measuring means indicates a deficiency of mass in said upper hemisphere and energizing said second element when said measuring means indicates a deficiency of mass in said lower hemisphere.

4. An apparatus for fine-balancing the inertial member of a gyroscope, said apparatus comprising:
   a housing enclosing a hermetically sealed chamber;
   a vacuum pump attached to said housing operable to maintain said chamber at a high vacuum level;
   means for supporting the inertial member within said housing for rotation about a spin axis;
   means for rotating said member about said spin axis;
   a source of electric potential;
   means for measuring the axial mass unbalance of said member; and
   vacuum vapor deposition means mounted on said housing adjacent said member, said deposition means being connected for receiving a signal from said source of electric potential when said measuring means indicates axial mass unbalance and depositing metallic vapor on said inertial member to correct said axial mass unbalance.

5. An apparatus for fine-balancing the inertial member of a gyroscope, said apparatus comprising:
   a vacuum chamber enclosing an inertial member;
   means for supporting the inertial member within said housing for rotation about a spin axis;
   means for rotating said member about said spin axis;
   a source of electric potential;
   means for measuring the axial mass unbalance of said member; and
   vacuum vapor deposition means mounted on said housing adjacent said member, said deposition means being connected for receiving a signal from said source of electric potential when said measuring means indicates unbalance and depositing metallic vapor on said inertial member to correct said mass unbalance.

References Cited by the Examiner

UNITED STATES PATENTS 2,691,306 10/1954 Beams et al.
2,937,613 5/1960 Larsh _____ 73—66 X
3,003,356 10/1961 Nordsicek.

RICHARD C. QUEISSER, *Primary Examiner.*

JAMES J. GILL, *Examiner.*

UNITED STATES PATENT OFFICE
CERTIFICATE OF CORRECTION

Patent No. 3,299,714                            January 24, 1967

Howard J. Thompson et al.

It is certified that error appears in the above identified patent and that said Letters Patent are hereby corrected as shown below:

Column 6, lines 8 to 11, cancel "means for measuring the means for rotating said member about said spin axis; mass unbalnace of said member;" insert -- means for rotating said member about said spin axis; means for measuring the axial mass unbalance of said member; --.

Signed and sealed this 9th day of December 1969.

(SEAL)
Attest:

Edward M. Fletcher, Jr.                          WILLIAM E. SCHUYLER, JR.
Attesting Officer                                       Commissioner of Patents